(12) United States Patent
Nakahara et al.

(10) Patent No.: US 7,575,829 B1
(45) Date of Patent: Aug. 18, 2009

(54) BATTERY HAVING REDUCED WEIGHT

(75) Inventors: Hiroshi Nakahara, Santa Clarita, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 635 days.

(21) Appl. No.: 11/100,266

(22) Filed: Apr. 5, 2005

(51) Int. Cl.
*H01M 2/08* (2006.01)
*H01M 2/00* (2006.01)

(52) U.S. Cl. .................... 429/175; 429/163
(58) Field of Classification Search .............. 429/175
See application file for complete search history.

(56) References Cited

U.S. PATENT DOCUMENTS 3,646,405 A * 2/1972 Wallis et al. ............... 361/518
2003/0091893 A1 * 5/2003 Kishiyama et al. ............ 429/94
2003/0121952 A1 * 7/2003 Tsukamoto ............... 228/122.1

* cited by examiner

*Primary Examiner*—Patrick Ryan
*Assistant Examiner*—Steven Scully
(74) *Attorney, Agent, or Firm*—Gavrilovich Dodd & Lindsey, LLP

(57) ABSTRACT

A battery case is disclosed. The case includes a cover bonded to a body such that a bottom of the cover and the body define at least a portion of the interior of a battery. The cover includes a second metal which is bonded to a first metal included in the battery body. The second metal is clad with a third metal such that the third metal covers less than 90% of an upper surface of the second metal. A hole extends through the second metal and the third metal. The case also includes a feedthrough assembly extending through the hole. The feedthrough assembly includes a feedthrough pin surrounded by a feedthrough body. The feedthrough body includes a fourth metal bonded to the third metal in the cover.

6 Claims, 6 Drawing Sheets

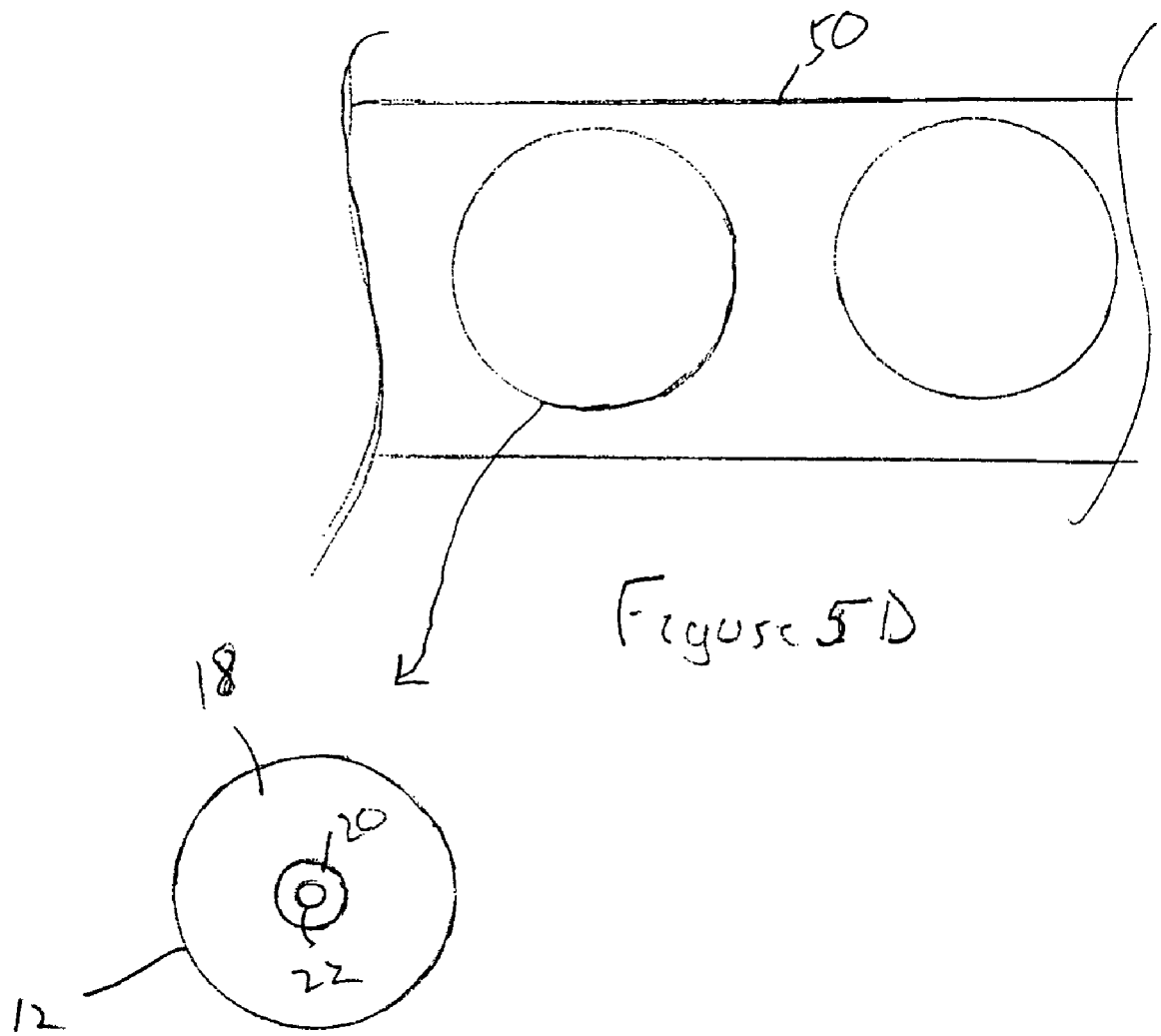

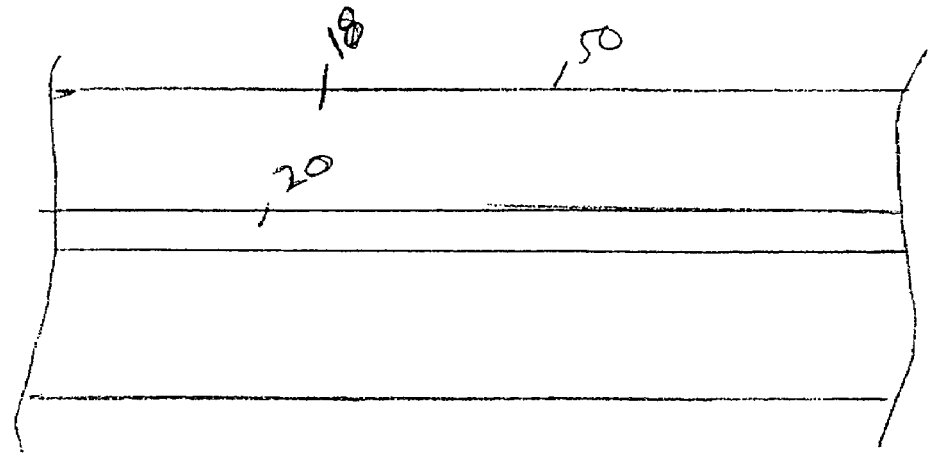
Figure 6A
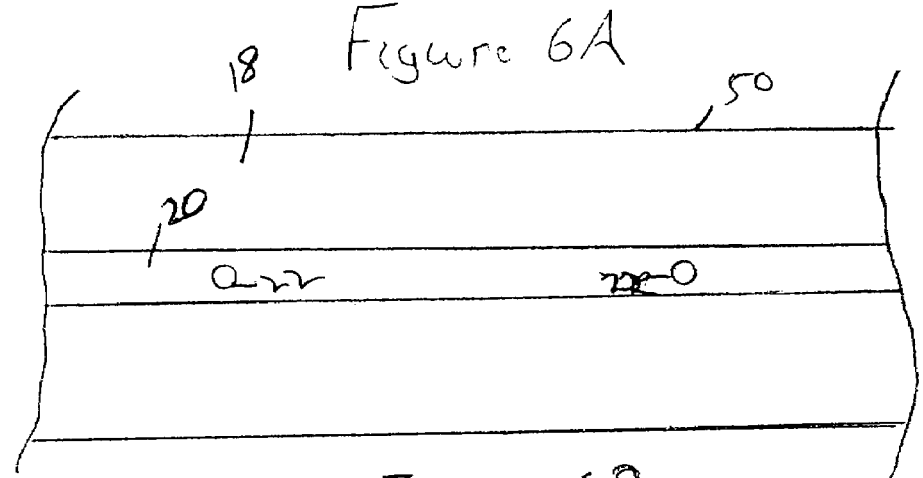
Figure 6B
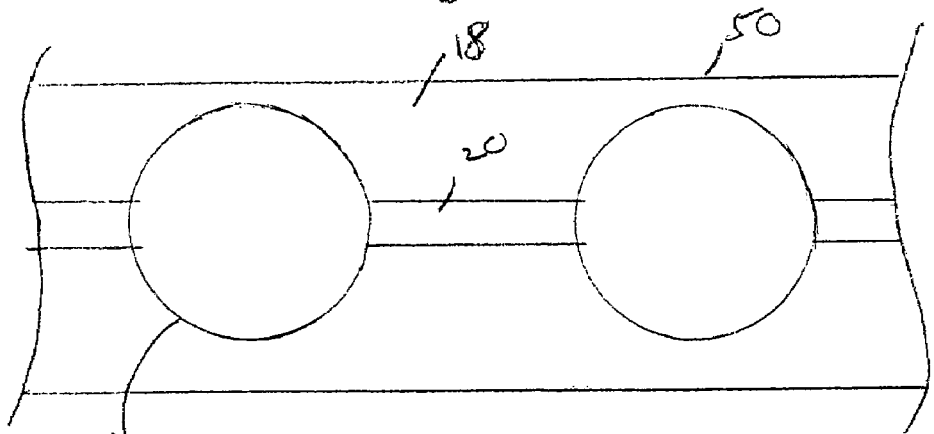
Figure 6C
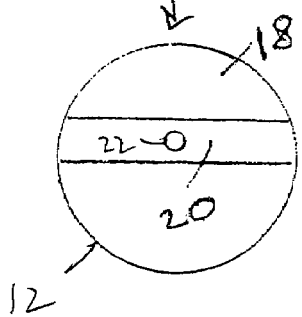

BATTERY HAVING REDUCED WEIGHT

STATEMENT REGARDING FEDERALLY SPONSORED RESEARCH OR DEVELOPMENT

This invention was made with United States Government support under contract NRO000-03-R-0111 awarded by the National Reconnaissance Organization (NRO). The United States Government has certain rights in this invention.

FIELD

The present invention relates to electrochemical devices, and more particularly to a battery case having a reduced weight.

BACKGROUND

A variety of batteries are used in applications where it is desirable to reduce the weight of the battery. An example is the batteries employed in satellite applications. Reducing the weight of these batteries can assist in the launch of satellites from earth. A large portion of the weight for these batteries is often found in the casing. As a result, it would be desirable to use lower density materials such as aluminum for the battery casing.

It is often desirable for these batteries to be hermetically sealed in order to reduce leakage. Fabricating these batteries often requires that a feedthrough assembly be hermetically attached to the battery casing. Hermetically attaching the feedthrough assembly can require high temperatures that are often on the order of 800° C. Temperatures at this level can melt lower density materials such as aluminum. If a battery case were made of aluminum, the process of attaching the feedthrough assembly can destroy the battery case. Accordingly, there is a need for a battery that can take advantage of low density casing materials.

SUMMARY

A battery case is disclosed. The case includes a cover bonded to a body such that a bottom of the cover and the body define at least a portion of the interior volume for a battery. The cover includes a second metal bonded to a first metal in the battery body. The second metal is clad with a third metal such that the third metal covers less than 90% of an upper surface of the second metal. A hole extends through the second metal and the third metal. The case also includes a feedthrough assembly extending through the hole. The feedthrough assembly includes a feedthrough pin surrounded by a feedthrough body. The feedthrough body includes a fourth metal bonded to the third metal on the cover. In some instances, the third metal is an inlay type cladding where the third metal is positioned in a recess in the second metal.

A method of forming a battery casing is also disclosed. The method includes causing a metal sheet to be formed with a third metal cladding a second metal. Forming the metal sheet includes employing a metal cladding process to clad the second metal with the third metal. The method also includes forming a cover from the metal sheet. The cover includes one or more holes extending through the second metal and the third metal and is formed such that the third metal covers less than 90% of an upper surface of the second metal. The method also includes bonding a feedthrough assembly to the third metal on the cover such that the feedthrough assembly is positioned in the hole. In some instances, the method further includes bonding the cover to a body of the battery casing where no portion of the third metal is removed from the cover between the time the second metal is clad with the third metal and the time the cover is bonded to the body. The metal cladding process can be an inlay type metal cladding process.

In some instances, the third metal covers less than 50% of the upper surface of the second metal or less than 20% of the upper surface of the second metal or less than 10% of the upper surface of the second metal.

In some instances, the first metal and the second metal are the same and the third metal and the fourth metal are the same. For instance, the first metal and the second metal can include or consist of aluminum, an alloy that includes aluminum, titanium and/or an alloy that includes titanium and the third metal and the fourth metal can include or consist of stainless steel.

The first metal and/or the second metal can each have a density that is less than the density of the third metal and the density of the fourth metal. A suitable ratio for the density of the density of the third metal 20 and/or the density of the fourth metal 30: density of the first metal 16 and/or the density of the second metal 18 includes ratios greater than 1.5:1; ratios greater than 2:1; or ratios greater than 3:1.

The first metal and/or the second metal can each have a melting point that is less than the melting point of the third metal and less than the melting point of the fourth metal. For instance, suitable ratios for the melting point of the third metal or the melting point of the fourth metal to the melting point of the first metal or the melting point of the second metal include ratios greater than 1.2:1; or ratios greater than 2:1 or ratios greater than 4:1 where the ratios are generated using temperatures measured in ° F.

BRIEF DESCRIPTION OF THE FIGURES

FIG. 5A through FIG. 5D illustrate a method of forming the cover illustrated in FIG. 1A and FIG. 1B.

FIG. 6A through FIG. 6C illustrate a method of forming the cover illustrated in FIG. 2A and FIG. 2B.

DESCRIPTION

A battery casing is disclosed. The casing includes a cover bonded to a body such that a bottom of the cover and the body define at least a portion of the battery interior. The cover includes a second metal partially clad by a third metal. The second metal is bonded to the body and the third metal is bonded to a feedthrough assembly. While metals with substantially different melting points often can not be bonded to one another with techniques such as laser welding, cladding technologies are available that permit cladding of one metal with another metal having a substantially different melting point. As a result, cladding the second metal with the third metal, allows the second metal to have a substantially lower melting point than the third metal. The elevated melting point of the third metal can be sufficient to withstand the conventional processes of feedthrough assembly attachment. As a result, the cladding allows the feedthrough to be attached to the casing. Further, the second metal can be a low density/low cost material such as aluminum because the third metal need not withstand the elevated temperatures associates with attachment of the feedthrough assembly. Additionally, the body can include a low density/low cost material such as aluminum because it is easily welded to other aluminum parts such as an aluminum second metal. Because the cladding permits the use of a body with low density/low cost materials such as aluminum, the cost and/or weight of the battery can be reduced.

The positioning of the third metal on the second metal can also be selected to further reduce the weight of the battery. For instance, the cover can include one or more holes extending through the second metal and the third metal. A feedthrough assembly is positioned in each of the holes. The third metal can surround each hole with enough material to properly bond the feedthrough assembly to the third metal while leaving the remainder of the second metal unclad by the third metal. Accordingly, the third metal can clad less than 90% of the upper surface of the second metal or less than 50% of the upper surface of the second metal. Because the second metal can have a lower density than the third metal, this localized placement of the third metal can substantially reduce the weight of the battery casing.

Figure 1A:
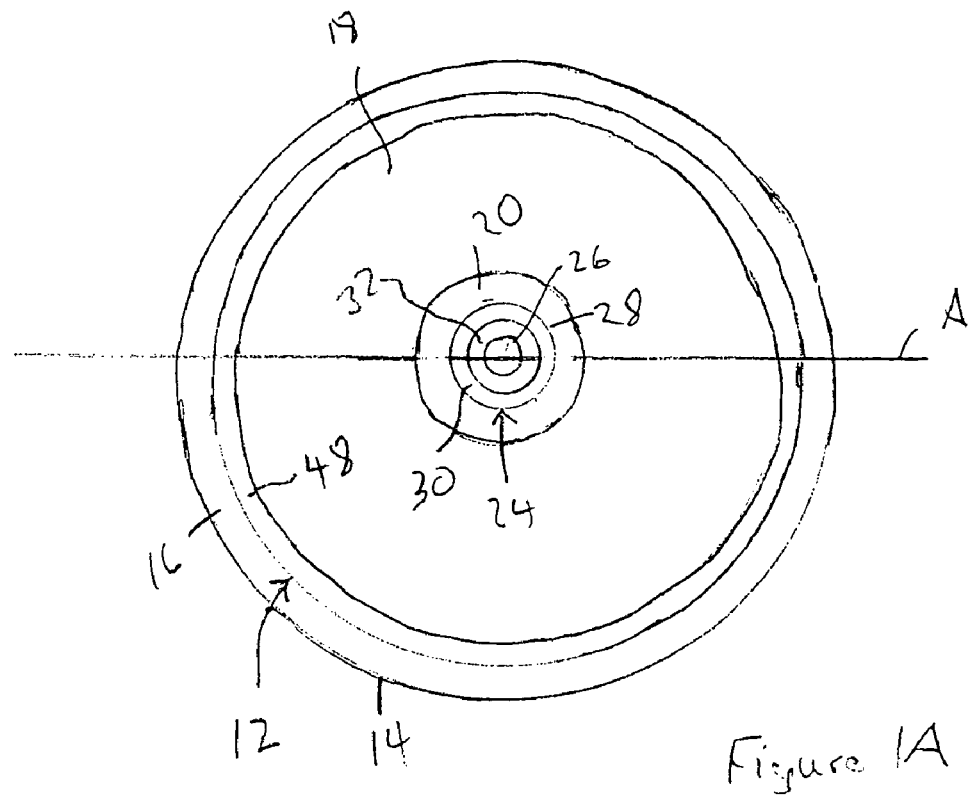
FIG. 1A is topview of a battery casing having a cover bonded with a battery body.
Figure 1B:
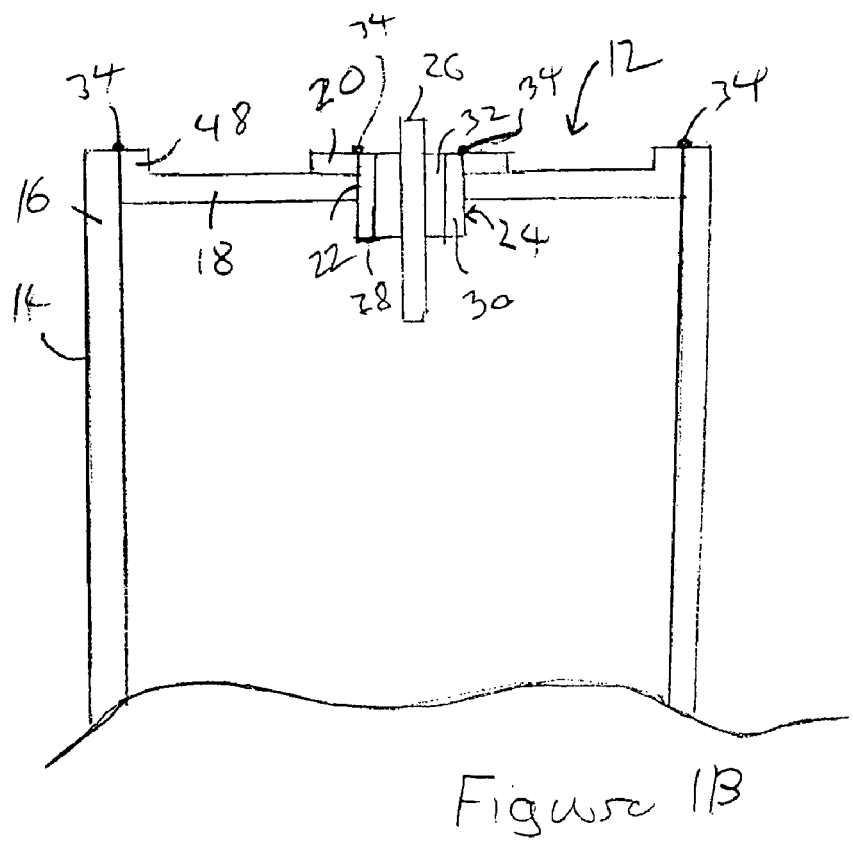
FIG. 1B is a cross section of the battery casing taken a long the line labeled A in FIG. 1A.

FIG. 1A and FIG. 1B illustrates an example of the battery casing. FIG. 1A is a topview of the battery casing and FIG. 1B is a cross section of the battery casing taken along the line labeled A in FIG. 1A. The battery includes a cover 12 attached to a body 14 such that a bottom side of the cover 12 and the body 14 define the interior of the battery where the electrodes, electrolyte and separator (not illustrated) are positioned. The body 14 includes or consists of a first metal 16. The cover 12 includes or consists of a second metal 18 clad by a third metal 20. A hole 22 extends through the first metal 16 and the second metal 18. A feedthrough assembly 24 is positioned in the hole 22. The feedthrough assembly 24 includes a feedthrough pin 26 and a feedthrough body 28 surrounding the feedthrough pin 26 and spaced apart from the feedthrough body 28. The feedthrough body 28 can include or consist of a fourth metal 30. An electrical insulator or dielectric 32 can be positioned between the feedthrough pin 26 and the feedthrough body 28. The dielectric 32 can be hermetically bonded to the feedthrough pin 26 and the feedthrough body 28. A suitable dielectric 32 includes, but is not limited to, ceramics. The ceramic can include glass materials or exclude glass materials.

The fourth metal 30 is bonded to the third metal 20 and the first metal 16 is bonded to the second metal 18. The bond 34 between the second metal 18 and the first metal 16 can surround at least a portion of the second metal 18 as is evident in FIG. 1B and FIG. 1A. Further, the bond 34 between the fourth metal 30 and the third metal 20 can surround the fourth metal 30 and can be surround by the third metal 20 as is evident in FIG. 1B and FIG. 1A. In some instances, the bond 34 between the first metal 16 and the second metal 18 provides a hermetic seal and the bond 34 between the third metal 20 and the fourth metal 30 provides a hermetic seal. Because the seal provided by the cladding of the second metal 18 with the third metal 20 can also be hermetic, this arrangement provides a hermetically sealed battery casing.

The third metal 20 is locally positioned on the second metal 18 in order to reduce the weight of the cover. For instance, the third metal 20 surrounds the hole 22 and feedthrough assembly 24 but need not extend to the perimeter of the second metal 18. As a result, the portions of the second metal 18 that are not clad with the third metal 20 can surround the third metal 20 as evident in FIG. 1A. Although the third metal 20 is illustrated as having a round shape in FIG. 1A, the third metal 20 can have other shapes including, but not limited to, oval, square and rectangular. In some instances, the third metal 20 extends no more than 10 mm past the bond 34 between the fourth metal 30 and the third metal 20; or no more than 20 mm past the bond 34 between the fourth metal 30 and the third metal 20, or no more than 30 mm past the bond 34 between the fourth metal 30 and the third metal 20. In some instances, the third metal 20 surrounding a hole 22 extends no more than 20 mm beyond the edge of the hole 22; no more than 30 mm beyond the edge of the hole 22; or no more than 50 mm beyond the edge of the hole 22 where the distance from the edge of the hole 22 at a particular location at the edge of the hole 22 is measured extending outward from the hole 22 in a direction perpendicular to the edge of the hole 22. In some instances, a ratio of the diameter of the third metal: diameter of the fourth metal is less than 10:1, less than 5:1, or less than 3:1.

As noted, the third metal 20 need not extend to the edge of the second metal 18 at any location about the perimeter of the second metal 18. This arrangement can reduce interference from the third metal 20 with the process of bonding the first metal 16 and the second metal 18. For instance, the third metal 20 does not interfere with the welding of the first metal 16 and the second metal 18. As a result, the strength of the weld is bonded. In some instances, the third metal 20 is more than 5 mm from the perimeter of the second metal 18 about the entire perimeter of the second metal 18; more than 1 mm from the perimeter of the second metal 18 about the entire perimeter of the second metal 18; or more than 0.1 mm from the perimeter of the second metal 18 about the entire perimeter of the second metal 18.

Figure 2B:
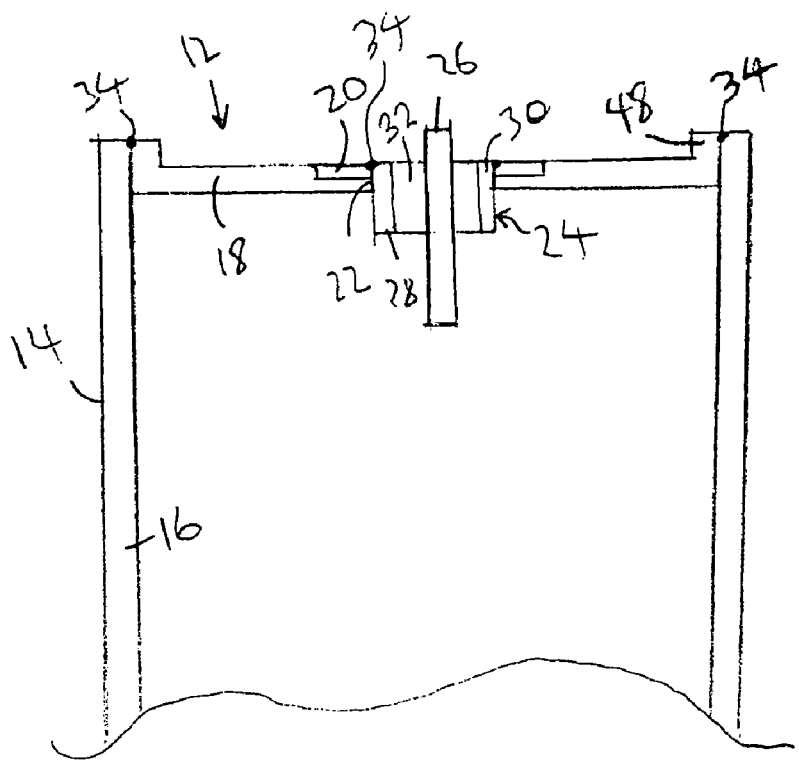
FIG. 2B is a cross section of the battery casing taken a long the line labeled A in FIG. 2A.
Figure 2A:
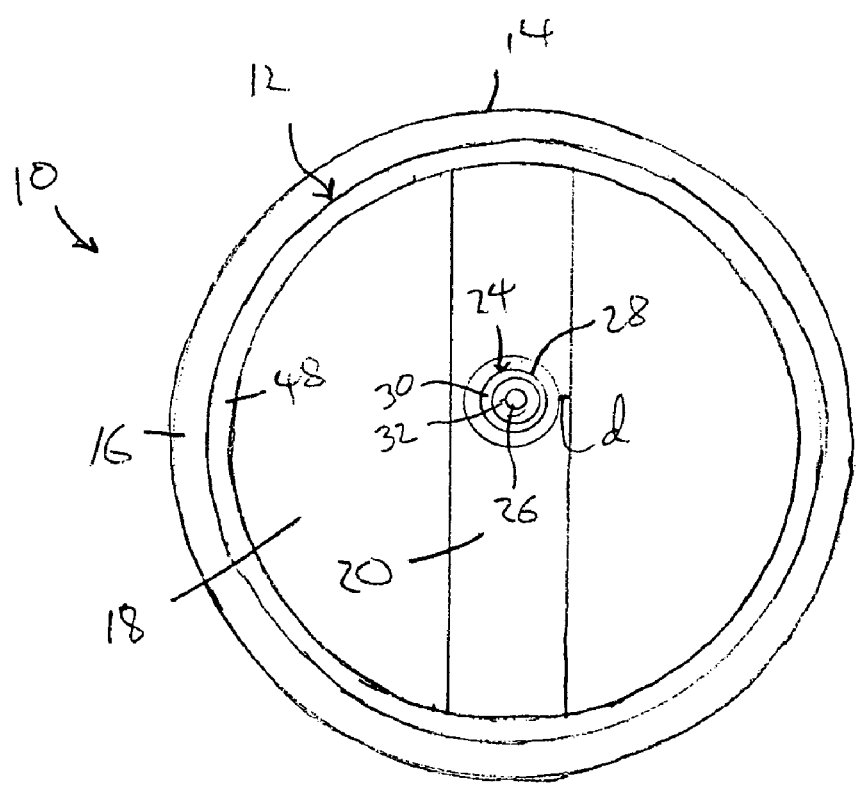
FIG. 2A is a topview of another embodiment of the battery casing. The cover has an inlay type cladding.

FIG. 2A and FIG. 2B illustrates another example of the battery casing. FIG. 2A is a topview of the battery casing and FIG. 2B is a cross section of the battery casing taken along the line labeled A in FIG. 2A. The cover 12 makes use of an inlay type cladding where the third metal 20 is positioned in a recess in the second metal 18. FIG. 2A and FIG. 2B illustrate a strip of the third metal 20 extending across the second metal 18. The hole 22 is surrounded by the third metal 20 as is evident in FIG. 2A. The minimum distance, labeled d, between the edge of the hole 22 and an edge of the stripe is preferably less than 5 mm, less than 1 mm or less than 0.1 mm in order to reduce the amount of the third metal 20 that is present on the cover. The strip shape of the third metal 20 might result in more third metal 20 being present in a cover 12 according to FIG. 2A and FIG. 2B than in a cover 12 according to FIG. 1A and FIG. 1B, however, the third metal 20 displaces the second metal 18 from the recess.

Although the third metal 20 is illustrated as a stripe extending across the second metal 18, the third metal 20 can have a round shape or other shape that is localized around the hole(s) as disclosed in the context of FIG. 1A and FIG. 1B. However, technologies for forming a stripe of inlay type cladding are readily available while fabrication of localized inlay claddings may be more difficult. When an inlay cladding is employed, the third metal 20 can be thicker than 0.1 mm, 0.3 mm or 0.5 mm.

As a result of the localized positioning of the third metal 20 illustrated in FIG. 1A through FIG. 2B, the third metal 20 can clad less than 90% of an upper surface of the second metal 18, 70% of an upper surface of the second metal 18, 30% of an upper surface of the second metal 18, or less than 20% of the upper surface of the second metal 18, or less than 15% of the upper surface of the second metal 18 and/or more than 10% of the upper surface of the second metal 18, more than 5% of the upper surface of the second metal 18, more than 3% of the upper surface of the second metal 18, or more than 1% of the upper surface of the second metal 18. The area of the upper surface of the second metal 18 refers to area of the second metal 18 that is positioned between on the exterior of the battery casing between the outer edge(s) of the second metal 18.

Suitable first metals 16 for the casings include, but are not limited to, aluminum, alloys that include aluminum, titanium, alloys that include titanium and nickel. Suitable second metals 18 include, but are not limited to, aluminum, alloys that include aluminum, titanium, alloys that include titanium and nickel. Suitable third metals 20 include, but are not limited to, steel and stainless steel. Suitable fourth metals 30 include, but are not limited to, steel and stainless steel. Suitable materials for the feedthrough pin 26 include, but are not limited to, stainless steel, titanium, aluminum, copper and nickel. Suitable ceramics include, but are not limited to, aluminum oxide ceramics, zirconium oxide ceramics, and CaBAl 12 glass.

In some instances, the first metal 16 is the same as the second metal 18 and the third metal 20 can be the same as the fourth metal 30. In one example, the first metal 16 and the second metal 18 are each aluminum and the third metal 20 and the fourth metal 30 are each stainless steel. In another example, the first metal 16 and the second metal 18 are each aluminum and the third metal 20 and the fourth metal 30 are each titanium.

The first metal 16 and/or the second metal can each have a density that is less than the density of the third metal 20 and the density of the fourth metal 30. Because a larger amount of the first metal 16 and second metal 18 is present in the casing, this arrangement reduces the weight of the battery. A suitable ratio for the density of the density of the third metal 20 and/or the density of the fourth metal 30: density of the first metal 16 and/or the density of the second metal 18 includes ratios greater than 1.5:1; ratios greater than 2:1; or ratios greater than 3:1. In one example, Stainless Steel has a density of around 7.96 g/cc and aluminum has a density of about 2.7 g/cc.

The first metal 16 and/or the second metal 18 can each have a melting point that is less than the melting point of the third metal 20 and less than the melting point of the fourth metal 30. For instance, suitable ratios for the melting point of the third metal or the melting point of the fourth metal to the melting point of the first metal or the melting point of the second metal include ratios greater than 1.2:1; or ratios greater than 2:1 or ratios greater than 4:1 where the ratios are generated using temperatures measured in ° F. In one example, the melting point of aluminum is about 950-1220° F. and the melting point of Stainless Steel is about 2500-2650° F. Additionally, the melting point of the first metal 16 and the second metal 18 can be close enough to permit welding of the first metal 16 and the second metal 18. Further, the melting point of the third metal 20 and the fourth metal 30 can be close enough to permit welding of the third metal 20 and the fourth metal 30. This welding can provide a hermetic seal. In one example, the welding is laser welding. The melting point of the third metal 20 and of the fourth metal 30 can each be substantially higher than the melting point of the first metal 16 and substantially higher than the melting point of the second metal 18 such as when the first metal 16 and the second metal 18 are each aluminum and the third metal 20 and the fourth metal 30 are each stainless steel. With this arrangement of melting points, the bond between the first metal 16 and the second metal 18 can be formed with a lower temperature weld than the bond between the third metal 20 and the fourth metal 30. Because the process of bonding the ceramic to the feedthrough body 28 can require high temperatures, the elevated melting point of the fourth metal 30 permits use of these ceramic bonding processes.

In the embodiments of the casing illustrated in FIG. 1A through FIG. 2B, the outer edge of the cover 12 is positioned adjacent to the interior of the casing body 14. The bond between the first metal 16 and the second metal 18 can be formed between the upper edge of the cover 12 and the upper edge of the casing body 14. This arrangement permits the cover 12 to be attached to the body 14 using a top down weld. The cover 12 illustrated in FIG. 1A includes a rim 48 positioned at the edge of the cover. The rim 48 is optional and need not be present on the cover. When the rim 48 is present, the bond can be formed between the upper edge of the rim 48 and the upper edge of the casing. Although not illustrated, the upper edge of the body 14 can optionally have a step. The cover 12 can rest on the step during the bonding of the cover 12 to the upper edge of the body 14.

Figure 3:
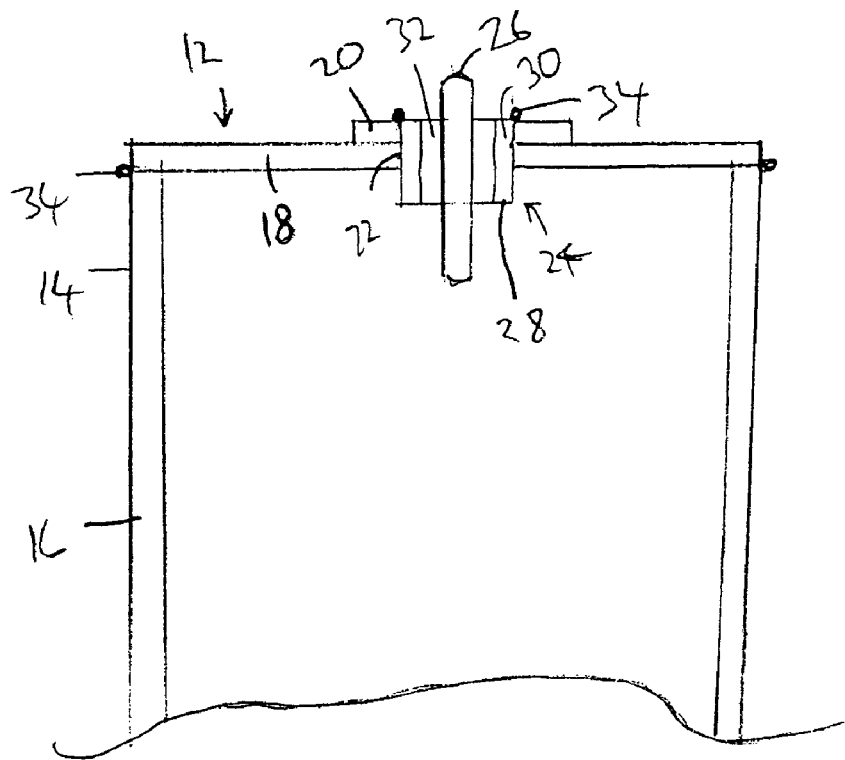
FIG. 3 is a cross section of another embodiment of the battery casing. A bottom side of the cover is positioned adjacent to an upper edge of the battery body.

FIG. 3 shows another embodiment of the battery casing. The bottom side of the second metal 18 is positioned adjacent to the upper edge of the body 14. The bond between the first metal 16 and the second metal 18 can be formed between the bottom side of the second metal 18 and the upper edge of the casing body 14. As a result, this arrangement permits the cover 12 to be attached to the body 14 using a side weld. In some instances, a top down weld may be preferred because it does not require rotation of the battery under a laser head. The connection between the cover 12 and the body 14 casing illustrated in FIG. 3 permits the outer edge of the cover 12 to be substantially flush with the exterior of the body 14 as illustrated or to extend beyond the exterior of the casing.

FIG. 1A through FIG. 3 do not illustrate the other end of the battery casing. The other end can be a closed end. Alternately, the other end can include a cover 12 such as the illustrated cover. Other known methods for closing the other end of a battery casing can be employed.

Figure 4:
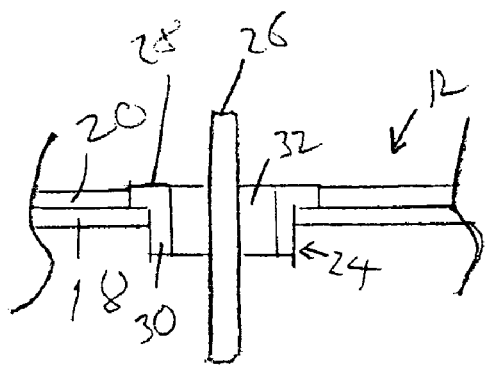
FIG. 4 is a cross section of a cove for the battery casing. A feedthrough assembly extends through a hole in the cover. The feed through assembly includes a metal surrounding a feedthrough pin. The outer surface of the metal includes a step.

The feedthrough body 28 can have a shape other than a cyclinder shape. For instance, FIG. 4 illustrates a feedthrough body 28 having an outer diameter that changes along the length of the feedthrough body 28 so as to form a step along the feedthrough body 28. The hole 22 can also have a step. As is evident in FIG. 4, the step on the feedthrough body 28 can rest on the step in the hole 22 during the process of bonding the fourth metal 30 to the third metal 20.

Although the above embodiments illustrate a battery casing with a single feedthrough assembly 24 extending through the cover, a plurality of feedthrough assemblies can extend through the cover. As is well known, when a plurality of feedthrough assemblies extend through the cover, a feedthrough assembly 24 can be electrically connected to one or more electrodes within the casing that are different from one or more electrodes to which another of the feedthrough assemblies is connected.

The battery casings are suitable for use with large batteries such as the batteries that are employed as the power source of a satellite, electric vehicle, and wearable devices. The battery casing can be employed with batteries having a volume larger than 300 cc, 150 cc, 100 cc, 70 cc, or 50 cc. Use of the casing with batteries having this volume can result in a second metal 18 upper surface area of greater than 1 cm$^2$, 3 cm$^2$ or 10 cm$^2$. Additionally, the thickness of the second metal 18 can be greater than 0.01 mm, 0.05 mm, 0.1 mm or 0.3 mm. Although the battery casing is disclosed in the context of large batteries, the casing can be used in conjunction with the smaller batteries associated with applications such as medical device, and portable devices.

The feedthrough assembly 24 can be formed by bonding a ceramic dielectric 32, feedthrough pin 26 and feedthrough body 28. Braze bonding and baking are examples of techniques that can be employed to form hermetic seal between the ceramic, feedthrough pin 26 and feedthrough. Braze bonding is suitable for bonding materials such as aluminum oxide and zirconium oxide ceramics to metals, including titanium, stainless steel, molybdenum, tantalum, and cobalt-chromium alloys. In some instances, the bonding can be performed using a brazing material that includes nickel and titanium. Another example of a braze bond includes zirconium oxide containing low concentrations of yttrium to a metal alloy such as a titanium and niobium alloy, using a nickel-titanium braze material. Other ceramics, such as CaBAl 12 glass, can be hermetically bonded to high melting temperature metals, such as PtIr or Ti-6Al-4V, by a baking process without the addition of a brazing material.

Figure 5A:
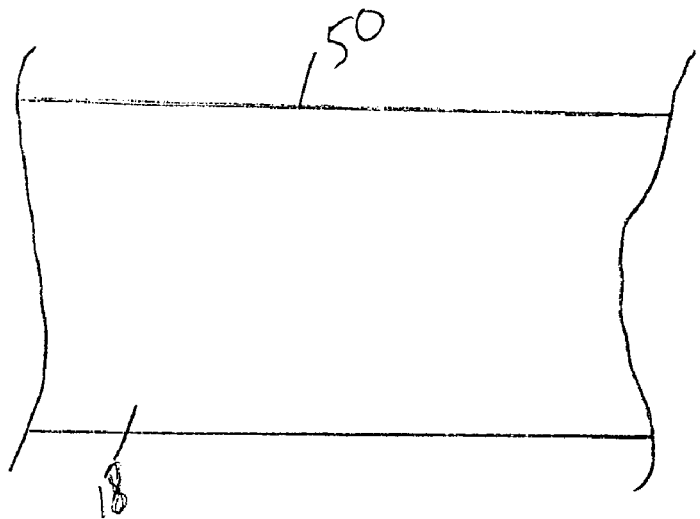

FIG. 5A through FIG. 5D illustrate a method of forming a cover 12 according to FIG. 1A and FIG. 1B. The cover 12 can be formed from a metal sheet 50 that includes the second metal 18 as shown in FIG. 5A. The metal sheet 50 can have a variety of different shapes including, but not limited to, a strip shape, square, rectangular, round or oval. The thickness of the second metal 18 in the metal sheet 50 can be about the desired thickness of the second metal 18 in the final cover. In some instances, the thickness of the second metal 18 in the metal sheet 50 may be reduced as a result of pressing and/or rolling during the subsequent processing of the metal sheet 50. In some instances, the metal sheet 50 is wider than the cover 12 to facilitate extraction of the cover 12 from the metal sheet 50.

Figure 5B:
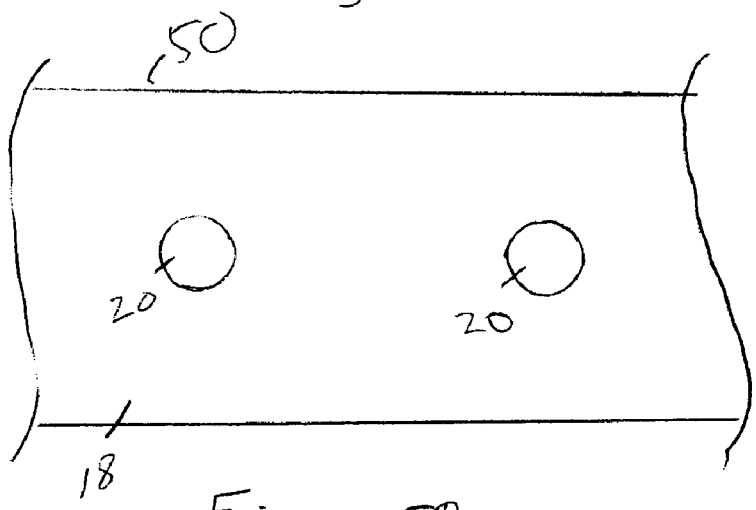

As shown in FIG. 5B, a metal cladding process is employed to clad the third metal 20 on the second metal 18 included in the metal sheet 50. Metal cladding processes can form a metallurgical bond between the second metal 18 and the third metal 20. Metal cladding processes are distinguishable from other metal bonding processes because they rely on elevated pressure to cause diffusion of the metals into one another. As a result, there is little or no melting of the metals in contrast with other metal bonding techniques such as welding. Additionally, metal cladding processes permit forming metal-to-metal bonds over large areas. As a result cladding processes are often suitable for bonding together the faces of metal strips or sheets. The above features allow the bond resulting from cladding processes to be distinguished from the bond formed by other processes.

There are different methods for forming clad metals, such as aluminum clad with stainless steel. In one method, the cladding metal is fed onto the metal sheet 50 in contact with the second metal 18 and the result is then passed to a hot roll bonding system. Another method produces a clad metal by forming and fixing a powder that includes or consists of the third metal 20 on the second metal 18 without heat, melting and solidifying only the surface and a subsurface area of the layer of the metal powder in a vacuum, and subjecting the material to hot isostatic pressing. Explosion bonding is another example of a method that is suitable for cladding thick layers of material. Suitable technologies for forming a cladding according to FIG. 5B are available from TMI (Technical Materials, Inc. of Lincoln, R.I.), Mitanishoji of Japan, and Cladmetals, LLC.

Figure 5C:
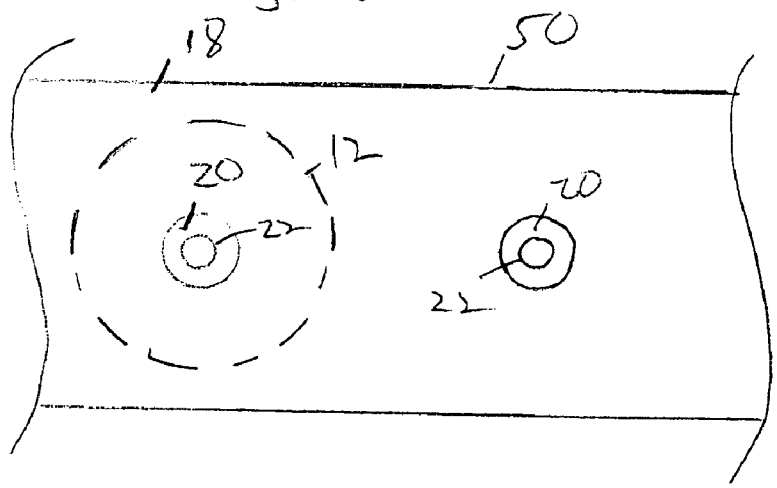

The holes 22 are formed through the first metal 16 and the second metal 18 in the desired locations as illustrated in FIG. 5C. Suitable methods for forming the holes 22 include, but are not limited to, milling and punching.

The cover 12 is extracted from the metal sheet 50 as illustrated in FIG. 5D. For instance, the cover 12 can be stamped or punched from the metal sheet 50. In some instances, the stamping or punching process forms a rim 48 on the cover 12 as illustrated in FIG. 1A and FIG. 1B.

The steps described in FIG. 5A through FIG. 5D can be performed in different order. For instance, the holes 22 can be formed in the cover 12 after the cover 12 is extracted from the metal sheet 50.

FIG. 6A through FIG. 6C illustrate a method of forming a cover 12 according to FIG. 2A and FIG. 2B. The cover 12 is formed from a metal sheet 50 that includes the second metal 18. As shown in FIG. 6A, an inlay type metal cladding process is employed to form one or more stripes of the third metal 20 in a recess on the second metal 18. Suitable technologies for forming inlay type cladding are available from TMI (Technical Materials, Inc. of Lincoln, R.I.), Mitanishoji of Japan, and Cladmetals, LLC.

The holes 22 are formed through the first metal 16 and the second metal 18 in the desired locations as illustrated in FIG. 6B. Suitable methods for forming the holes 22 include, but are not limited to, milling and punching.

The cover 12 is extracted from the metal sheet 50 as illustrated in FIG. 6C. For instance, the cover 12 can be stamped or punched from the metal sheet 50. In some instances, the stamping or punching process forms a rim 48 on the cover 12 as illustrated in FIG. 1A and FIG. 1B.

The steps described in FIG. 6A through FIG. 6C can be performed in different order. For instance, the holes 22 can be formed in the cover 12 after the cover 12 is extracted from the metal sheet 50.

The battery casing can be formed by bonding the cover 12 to the body 14 of the casing and by bonding the one or more feedthrough assemblies to the cover. The cover 12 can be bonded to the body 14 either before or after the one or more feedthrough assemblies are bonded to the cover. As noted above, welding can be employed to bond the cover 12 to the body 14 and to bond the one or more feedthrough assemblies to the cover. The weld employed to bond the one or more feedthrough assemblies to the cover 12 can be a higher temperature weld than the weld employed to bond the cover 12 to the body 14.

The method of forming the cover 12 illustrated in FIGS. 5A through 5D and/or FIG. 6A through FIG. 6C eliminate the need to remove third metal 20 from the cover 12 between the time the second metal 18 is clad with the third metal 20 and the time the cover 12 is bonded to the body 14. Prior batteries that have made use of metal cladding processes have used overlay cladding process. As a result, a portion of the metal cladding was removed from the cover 12 by methods such as machining. In the above method, the shape of the third metal 20 at the time of cladding can be the same as the shape of the third metal 20 after attachment of the cover 12 to the body 14. Similarly, the shape of the third metal 20 on the portion of the metal sheet 50 that serves as a cover 12 at the time of cladding can be the same as the shape of the third metal 20 after attachment of the cover 12 to the body 14.

Techniques for bonding the feedthrough pin 26(s) and/or other parts of the casing to electrodes in the interior of the battery casing are well known and can be employed at various different times during the assembly of the battery casing to provide the battery with the necessary electrical connections.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery case comprising:
   a battery body including a first metal;
   a cover bonded to the battery body such that a bottom side of the cover and the body define an interior of a battery, the cover including
   a second metal bonded to the first metal in the battery body,
   the second metal being clad with a third metal and the second metal being bonded to the third metal with a bond that is in accordance with a bond formed by a metal cladding process that relies on elevated pressure to cause diffusion of the second metal and the third metal into one another,
   the third metal covering less than 90% of an upper surface of the second metal,
   one or more holes extending through the second metal and the third metal, a feedthrough assembly positioned in one of the one or more holes, including
   a feedthrough pin, and
   a body surrounding the feedthrough pin, the body including a fourth metal bonded to the third metal with the fourth metal being a different piece of metal than the third metal.

2. The case of claim 1, wherein the fourth metal is hermetically sealed to the third metal.

3. The case of claim 1, wherein a ceramic is positioned between the body and the feedthrough pin.

4. The case of claim 1, wherein the fourth metal is the same type of metal as the third metal and the second metal is the same type of metal as the first metal.

5. The case of claim 1, wherein the feedthrough pin is one of a plurality of feedthrough pins.

6. A method of forming a battery case, comprising:
   causing a metal sheet to be formed with a third metal cladding a second metal, formation of the metal sheet including employing a metal cladding process to clad the second metal with the third metal, the metal cladding process relying on elevated pressure to cause diffusion of the second metal and the third metal into one another;
   forming a cover for a battery casing from the metal sheet, the cover including at least one hole extending through the second metal and the third metal, and being formed such that the third metal covers less than 90% of an upper surface of the second metal;
   bonding a feedthrough assembly to the third metal on the cover such that the feedthrough assembly is positioned in the hole, the feedthrough assembly includes a fourth metal surrounding a feedthrough pin and bonding the feedthrough assembly to the third metal includes welding the fourth metal to the third metal.

* * * * *